3,657,158
POLYMERIZATION OF EPOXIDES WITH DIHYDROCARBON ZINC PRE-REACTED WITH A POLYHYDRIC PHENOL
Edwin J. Vandenberg, Wilmington, Del., assignor to Hercules Incorporated, Wilmington, Del.
No Drawing. Continuation-in-part of application Ser. No. 18,862, Mar. 31, 1960. This application Mar. 25, 1970, Ser. No. 22,690
Int. Cl. C08g 23/06, 23/14
U.S. Cl. 260—2
7 Claims

ABSTRACT OF THE DISCLOSURE

Oxiranes are polymerized using as the catalyst the product obtained by reacting a dihydrocarbon zinc compound, such as diethylzinc, with a polyhydric phenol such as resorcinol or pyrogallol, in a molar ratio of polyhydric phenol to zinc compound of from about 0.2:1 to about 1.2:1. Higher molecular weight polymers and/or higher yields of polymers are obtained than when the dihydrocarbon zinc compound is used without pre-reacting it with the polyhydric phenol.

---

This application is a continuation-in-part of my application Ser. No. 18,862 filed Mar. 31, 1960, now U.S. Pat. No. 3,536,634.

This invention relates to a new process for polymerizing epoxides and more particularly to a process for polymerizing epoxides with organozinc compounds whereby high molecular weight polyepoxides of outstanding properties are produced.

In accordance with this invention it has been discovered that greatly improved results are obtained in the polymerization of epoxides when there is used as the catalyst for the polymerization a dihydrocarbon zinc compound that has been reacted with a polyhydric phenol. The amount of the phenol that is reacted with the dihydrocarbon zinc is critical and should be an amount within the range of from about 0.2 mole to about 1.2 mole of the phenol per mole of dihydrocarbon zinc. By carrying out the polymerization in accordance with this invention it has been found that the conversion and/or rate of polymerization and/or yield are greatly improved over the process when a diorganozinc which has not been reacted with a polyhydric phenol is used as the catalyst. In addition, a much higher molecular weight polymer is obtained, and in some cases a more stereoregular polymer results.

An epoxide may be homopolymerized or copolymerized with a second epoxide by the process of this invention. Outstanding results are obtained with ethylene oxide, mono-substituted ethylene oxides

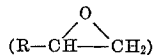

and symmetrically di-substituted ethylene oxides

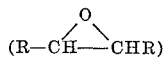

where R is a hydrocarbon radical such as alkyl, aryl, cycloalkyl, etc. Exemplary of these epoxides that may be homopolymerized or copolymerized are the alkylene oxides such as ethylene oxide, propylene oxide, 1-butene oxide, 2-butene oxides, isobutylene oxide, 1-hexene oxide, and substituted alkylene oxides such as cyclohexene oxide, styrene oxide, glycidyl ethers of phenol, bisphenol, etc., unsaturated epoxides such as vinyl cyclohexene, mono and dioxides, butadiene monoxide, allyl glycidyl ether, etc. Halogen-containing epoxides may also be polymerized by this process and are particularly important in the preparation of copolymers of alkylene oxides. Exemplary of such halogen-containing epoxides that may be so polymerized or copolymerized are epichlorohydrin, epibromohydrin, epifluorohydrin, trifluoromethyl ethylene oxide, perfluoropropylene oxide, perfluoroethylene oxide, etc.

Any organozinc compound having the formula ZnRR', where R and R' are hydrocarbon radicals that may be alike or different, when reacted with the above-mentioned polyhydric phenols can be used as the catalyst for the polymerization of epoxides in accordance with this invention. Exemplary of the dihydrocarbon zinc compounds that can be used for the preparation of the catalyst are dimethylzinc, diethylzinc, dipropylzinc, diisopropylzinc, di-n-butylzinc, diisobutylzinc, di-tert-butylzinc, diamylzinc, dioctyl zinc, dicyclohexylzinc, dicyclopentadienylzinc, diphenylzinc, etc. The dialkylzinc compounds being more readily obtained are generally preferred. Regardless of the dihydrocarbon zinc compound that is used, it should be reacted with the polyhydric phenol in a molar ratio of from about 0.2 mole to about 1.2 mole, and preferably from about 0.4 mole to about 1.0 mole per mole of dialkylzinc compound. Below or above these ratios the polymerization is retarded or otherwise adversely affected, as for example, there is produced a liquid polymer instead of a high molecular weight solid polymer. The exact amount of the polyhydric phenol that is reacted with the organozinc compound will depend to some extent upon the diluent, temperature, the epoxide being polymerized, the desired molecular weight of the polymer to be produced, the method of preparing the catalyst, etc.

As pointed out above, the diorganozinc used as the catalyst in accordance with this invention is reacted with a polyhydric phenol. Exemplary of the polyhydric phenols that can be used are resorcinol, hydroquinone, catechol, etc.

The exact nature of this reaction product of the dihydrocarbon zinc compound with the polyhydric phenol is not known. It is believed that a reaction takes place whereby a portion of the organo group of the dihydrocarbon zinc is replaced, as for example, when a dialkylzinc is reacted, the alkyl group is replaced with the liberation of the alkane and replacement of the alkyl group with an OR group, the R depending upon the polyhydric phenol. Regardless of what the theory of the reaction may be, it is essential that the reaction product retain zinc-carbon bonds in an amount of from about 0.1 to about 1.6 carbon bonds per zinc atom, and preferably from about 0.3 to about 1.2 carbon bonds per zinc atom, which catalysts are obtained when the organozinc compound is reacted with the polyhydric phenol in the above-specified molar ratios.

Any desired procedure may be used for reacting the dihydrocarbon zinc with the specified molar ratio of polyhydric phenol. Thus, the diorganozinc and phenol are prereacted by adding the specified amount of the polyhydric phenol to a solution of the diorganozinc in an inert diluent, as for example, a hydrocarbon diluent, such as n-hexane, n-heptane, toluene, or an ether such as diethyl ether or a mixture of such diluents. These diorganozinc polyhydric phenol reaction products may be used immediately or aged, or if desired, heat-treated in some cases. The reaction of the diorganozinc and the polyhydric phenol is carried out prior to use in the polymerization reaction.

In some cases it has been found to be advantageous to react the diorganozinc—polyhydric phenol reaction product with a complexing agent, as for example, an ether such as diethyl ether, tetrahydrofuran, etc., a tertiary amine, a tertiary phosphine, etc. The diorganozinc may be reacted first with the polyhydric phenol, and then with the complexing agent, or the complexing agent may be present while forming the catalyst. The amount of complexing agent reacted with the catalyst is generally within the range of from about 0.5 mole to about 30 moles, and preferably from about 1 to about 10 moles per mole of organozinc compound used in preparing the catalyst, depending on the complexing agent used.

Any amount of the diorganozinc reaction product prepared as described above may be used to catalyze the polymerization process in accordance with this invention from a minor catalytic amount up to a large excess, but in general, will be within the range of from about 0.2 to about 10 mole percent based on the zinc and the monomer being polymerized and preferably will be within the range of from about 1 to about 5 mole percent based on the zinc and the monomer or monomers being polymerized. The amount used depends in part on such factors as monomer purity, diluent purity, etc., less pure epoxides and diluents requiring more catalyst to destroy reactive impurities. In order to decrease catalyst consumption it is generally preferred that impurities such as carbon dioxide, oxygen, aldehydes, alcohols, etc., be kept at as low a level as practical.

The polymerization reaction may be carried out by any desired means, either as a batch or continuous process with the catalyst added all at one time or in increments during the polymerization or continuously throughout the polymerization. If desired, the monomer may be added gradually to the polymerization system. It may be carried out as a bulk polymerization process, in some cases at the boiling point of the monomer (reduced or raised to a convenient level by adjusting the pressure) so as to remove the heat of reaction. It may also be carried out in the presence of an inert diluent. Any diluent that is inert under the polymerization reaction conditions may be used, as for example, ethers such as the dialkyl, aryl or cycloalkyl ethers such as diethyl ether, dipropyl ether, diisopropyl ether, aromatic hydrocarbons such as benzene, toluene, etc., or saturated aliphatic hydrocarbons and cycloaliphatic hydrocarbons such as n-heptane, cyclohexane, etc. Obviously, any mixture of such diluents may be used and in many cases is preferable. The polymerization process may also be carried out in the presence of additives such as antioxidants, carbon black, zinc stearate, sulfur, some accelerators and other curatives, etc.

The polymerization process in accordance with this invention may be carried out over a wide temperature range and pressure. Usually, it will be carried out at a temperature from about −80° C. up to about 150° C., preferably within the range of from about −50° C. to about 120° C., and more preferably from about −30° C. to about 100° C. Usually, the polymerization process will be carried out at autogeneous pressure, but superatmospheric pressures up to several hundred pounds may be used if desired and in the same way, subatmospheric pressures may also be used.

The following examples exemplify the improved results that may be obtained on polymerizing epoxides in accordance with this invention. All parts and percentages are by weight unless otherwise indicated. As will be seen from these examples, the process of this invention makes it possible to not only obtain greatly improved yields of polymer but makes it possible to produce polymers of exceptionally high molecular weight. The molecular weight of the polymers produced in these examples is shown by the reduced specific viscosity (RSV) given for each. By the term "Reduced Specific Viscosity" is meant the $\eta_{sp./c.}$ determined on a 0.1% solution of the polymer is a given diluent. In the case of polyethylene oxide the RSV is determined in chloroform at 25° C., and in the case of polypropylene oxide the RSV is determined in benzene at 25° C. Hence, in the citation of the RSV, the diluent and temperature at which the RSV is determined are stipulated.

EXAMPLES 1–5

In each of these examples a polymerization vessel filled with nitrogen was charged with that part of the diluent not added with the catalyst and 10 parts of ethylene oxide. After equilibrating the vessel and contents at 30° C., the catalyst was injected. The catalyst dispersions used in each of these examples were prepared from 0.49 part in Examples 1 and 3–5 and 0.31 part in Example 2 of diethylzinc by diluting n-heptane solutions of diethylzinc with ether to 0.5 M concentration, except in Examples 2 and 5 where it was diluted to 0.33 M concentration, and then adding an amount of the specified polyhydric phenol equal to the specified mole ratio, and agitating the mixture in the presence of glass beads at 30° C. for 20 hours. The polymerization reaction mixtures were agitated at 30° C. for 19 hours in Examples 1, 2 and 5, and 21 hours in Examples 3 and 4. In Table I is set forth the total parts of diluent which was a mixture of ether and n-heptane and the percent of ether therein, the catalyst used, together with total percent conversion, and the conversion to ether-insoluble polymer and the RSV of the ether-insoluble polymer as determined in chloroform at 25° C.

The ether-insoluble poly(ethylene oxide) produced in each case was isolated by adding excess ether to the reaction mixture, filtering off the insoluble portion, washing it with ether, then with 0.5% hydrogen chloride in an 80:20 mixture of ether:methanol, with 80:20 ether:methanol alone, and then with ether containing 0.5% Santonox, i.e., 4,4′-thiobis(6-tert-butyl-m-cresol) and dried under vacuum for 16 hours at 50° C.

TABLE I

| Example | Diluent Total parts | Percent ether | Catalyst | Total percent conversion | Ether-insoluble polymer percent conversion | RS |
|---|---|---|---|---|---|---|
| 1 | 33.8 | 7.4 | $(C_2H_5)_2Zn.0.5$ resorcinol | 58 | 58 | 21 |
| 2 | 33.8 | 11.8 | $(C_2H_5)_2Zn.0.8$ hydroquinone | 27 | 22 | 4.4 |
| 3 | 34 | 11 | $(C_2H_5)_2Zn.0.8$ pyrocatechol | 62 | 62 | 4.0 |
| 4 | 34 | 11 | $(C_2H_5)_2Zn.0.53$ pyrogallol | 99 | 99 | 7.38 |
| 5 | 34 | 19 | $(C_2H_5)_2Zn.0.8$ santonox | 73 | 73 | 6.0 |

EXAMPLE 6

Propylene oxide (9 parts) and allyl glycidyl ether (1 part) were copolymerized following the generaly procedure described in Examples 1–5. The catalyst used was the same diethylzinc- pyrogallol catalyst used in Example 4. Analysis of the catalyst showed it to contain 0.34 ethyl groups per mole of zinc. The total diluent amounted to 5.2 g. of which 70% was diethyl ether and the rest n-heptane. The copolymerization was carried out at 30 °C. for 19 hours. The propylene oxide-allyl glycidyl ether copolymer was isolated by adding sufficient ether to make the solution of a low enough viscosity for ease in handling, then washing the reaction mixture twice with a 3% aqueous solution of hydrogen chloride (stirring for one hour for each wash), washing with water until neutral, then with aqueous 2% sodium bicarbonate and again washing with water until neutral. After adding an amount of Santonox equal to 0.5% based on the polymer to the reaction mixture, the diluents were evaporated, and the polymer was dried for 16 hours at 80° C. at 0.4 mm. pressure. It amount to a conversion of 17% and had an RSV of 1.3 as measured on a 0.1% solution in benzene at 25° C.

What I claim and desire to protect by Letters Patent is:

1. The process of producing poly(epoxides) which comprises polymerizing at least one epoxide, said epoxides being monoepoxides wherein the epoxy group is an oxirane ring, by contacting said epoxide with the catalyst formed by pre-reacting a dihydrocarbylzinc with a polyhydric phenol in a molar ratio of polyhydric phenol to zinc compound of from about 0.2:1 to about 1.2:1.

2. The process of claim 1 wherein the zinc compound is a dialkylzinc.

3. The process of claim 2 wherein the epoxide that is polymerized is an alkylene oxide.

4. The process of claim 2 wherein a mixture of an alkylene oxide and an ethylenically unsaturated epoxide is copolymerized.

5. The process of claim 3 wherein ethylene oxide is polymerized by contacting ethylene oxide with the catalyst formed by pre-reacting diethylzinc with resorcinol in a molar ratio of resorcinol to diethylzinc of from about 0.4:1 to about 1.0:1.

6. The process of claim 3 wherein ethylene oxide is polymerized by contacting ethylene oxide with the catalyst formed by pre-reacting diethylzinc with pyrogallol in a molar ratio of pyrogallol to diethylzinc of from about 0.4:1 to about 1.0:1.

7. The process of claim 4 wherein propylene oxide and allyl glycidyl ether are copolymerized by contacting a mixture of the two epoxides with the catalyst formed by reacting diethylzinc with pyrogallol in a molar ratio of pyrogallol to diethylzinc of from about 0.4:1 to about 1.0:1.

References Cited

UNITED STATES PATENTS 3,536,634  10/1970  Vanderberg _____ 260—2

FOREIGN PATENTS 875,161  8/1961  Great Britain _____ 260—2
875,162  8/1961  Great Britain _____ 260—2

OTHER REFERENCES

Chemical Abstracts 59, 12999a (1963).

WILLIAM H. SHORT, Primary Examiner

E. A. NEILSEN, Assistant Examiner

U.S. Cl. X.R.
252—431 R; 260—615 B

PO-1050
(5/69)

UNITED STATES PATENT OFFICE
CERTIFICATE OF CORRECTION

Patent No. 3,657,158                 Dated April 18, 1972

Inventor(s) Edwin J. Vandenberg (Case 63-135)

It is certified that error appears in the above-identified patent and that said Letters Patent are hereby corrected as shown below:

Column 4, Table 1, last column; the Heading "RS" should read --RSV--

Column 4, Table 1, last column; "4.0" should read --4.8--

Column 4, Table 1, last column; "7.38" should read --7.3--

Signed and sealed this 12th day of September 1972.

(SEAL)
Attest:

EDWARD M. FLETCHER, JR.             ROBERT GOTTSCHALK
Attesting Officer                    Commissioner of Patents